US012748488B2

(12) United States Patent
Cserey

(10) Patent No.: US 12,748,488 B2
(45) Date of Patent: Sep. 29, 2026

(54) AUGMENTED REALITY BASED SYSTEM AND METHOD

(71) Applicant: PÁZMÁNY PÉTER KATOLIKUS EGYETEM, Budapest (HU)

(72) Inventor: György Gábor Cserey, Budapest (HU)

(73) Assignee: PÁZMÁNY PÉTER KATOLIKUS EGYETEM, Budapest (HU)

( * ) Notice: Subject to any disclaimer, the term of this patent is extended or adjusted under 35 U.S.C. 154(b) by 0 days.

(21) Appl. No.: 18/687,058

(22) PCT Filed: Oct. 28, 2022

(86) PCT No.: PCT/IB2022/060384
§ 371 (c)(1),
(2) Date: Feb. 27, 2024

(87) PCT Pub. No.: WO2023/031898
PCT Pub. Date: Mar. 9, 2023

(65) Prior Publication Data

US 2024/0393870 A1 Nov. 28, 2024

(30) Foreign Application Priority Data

Aug. 31, 2021 (HU) .................................... P2100311

(51) Int. Cl.
*G06F 3/01* (2006.01)
*G06T 7/33* (2017.01)

(52) U.S. Cl.
CPC .............. *G06F 3/012* (2013.01); *G06T 7/337* (2017.01); *G06T 2207/10028* (2013.01); *G06T 2207/20081* (2013.01); *G06T 2207/20221* (2013.01)

(58) Field of Classification Search
CPC . G06T 7/33; G06T 7/337; G06T 2207/10028; G06T 2207/20081; G06T 2207/20221; G06F 3/012
See application file for complete search history.

(56) References Cited

U.S. PATENT DOCUMENTS

2017/0336220 A1* 11/2017 Broaddus ................ G06T 7/285

FOREIGN PATENT DOCUMENTS

WO WO 2017131838 A2 * 8/2017 ......... H04N 23/6812

* cited by examiner

*Primary Examiner* — Scott D Au

(57) ABSTRACT

The invention is an augmented reality-based system for generating and displaying a continuous and real-time augmented reality view corresponding to a current orientation of a user. The system has a head-mountable device worn by a user, with a mount to stably a fix on the head, sensors for detecting physical characteristics of the user and their environment, a display for displaying an augmented reality view, and an integrated computing and communication unit. The system has a database with reference data from sonar images and/or 2-dimensional camera images with different spatial orientations, wherein the data detected by the sensors in one spatial orientation can be matched with reference data in one spatial orientation. The invention further relates to a method for generating and displaying a continuous and real-time augmented reality view according to a current orientation of a user.

11 Claims, 9 Drawing Sheets

AUGMENTED REALITY BASED SYSTEM AND METHOD

BACKGROUND OF THE INVENTION

The present invention relates to an augmented reality based system and method for generating and displaying a continuous and real-time augmented reality view corresponding to a current orientation of a user.

Poor visibility conditions, which can occur in both land and water environments, can make navigation very difficult and can affect the performance of activities in these conditions.

A night vision camera, which amplifies reflected light from the moon and/or stars, or a thermal camera, which detects the thermal energy emitted by objects, can be used in clear weather to improve or enable visual perception of the environment in poor visibility conditions due to lighting conditions. If, in addition to poor light conditions, rain, fog, dust, smoke or other environmental conditions affecting visibility, further reduce visibility, it is worth using devices other than a conventional camera, such as sonars, to enable visual perception of the environment. Sonars, which are essentially sound-based sensors, can also be used effectively in water and air, where sound waves can propagate.

In poor visibility conditions, mapping of a given land or water environment is now typically carried out using fixed sensors or sensors mounted on mobile devices such as drones, land or water vehicles, such as sonars. Although these methods are capable of providing the user with 2-dimensional or 3-dimensional depth/relief images, these images can essentially only be used as a standard map.

For example, if there are rainstorms, heavy rain, strong wind, sandstorms on dry land, or strong flows and currents in the water, the user cannot look at the previously generated 2-dimensional or 3-dimensional image, but can only use it from memory, so areas or objects with unknown geometry are essentially approached blindly, by groping. This can make navigation and movement in the environment dangerous, slow and difficult. In poor visibility conditions, it would be necessary for the user, even while moving, to have continuous and up-to-date visual information about the desired area and any objects that may be located therein, according to the current orientation of the user.

WO2017131838A2 relates to an apparatus and method for generating a 2-dimensional or 3-dimensional representation of the underwater environment based on a fusion of data from multiple deployed static and deployed movable sensors, which representation can be displayed on a movable device by tracking the user's movement. The device principally provides data on the underwater environment, such as the bottom topography, to aid navigation of a mobile structure, such as a boat. The displayed image is generated based on data fusion on an external device and is entirely dependent on the actual image detected by the sensors, which are limited by the location of the sensors and the current visibility. Although the displayed image tracks the user's movement, it is not capable of representing the user's orientation or a realistic sense of distance, but only the orientation of the generated image is performed. The data fusion of the detected data from the sensors is also not perform locally, but by an external unit. Furthermore, the invention is not capable of improving or correcting for missing or poor quality images, and the invention is also unable to match a specific object to generate an augmented reality view.

WO2013049248A2 relates to a near field communication (NFC) system comprising deployed sensors and a head-mounted device with sensors capable of displaying a 2-dimensional video recording of the external environment on its display. One embodiment of the device allows representation of object locations in low visibility conditions by using overlapping map data to determine the exact location of each object. Essentially, the system can improve the displayed video recording by fusing the overlapping image data, but in this case the data quality also depends on the current recorded images, which are uniformly of poor quality in low visibility conditions. The invention is not suitable for fitting an image of an object as an augmented reality, so that the image provided to the user cannot track the user's current position and orientation.

The present invention provides an augmented reality based system and method for generating and displaying a continuous and real-time augmented reality view corresponding to a current orientation of a user, wherein the augmented reality view is generated by fusing data detected by sensors and matching image data of reference data according to a given spatial orientation. By using the reference data, the image quality can be improved such that the images can be used to accurately match the virtual space and the objects therein, thereby representing them together on the image, thus creating an augmented reality view. The augmented reality view created in this way is suitable for providing a real-time environmental representation corresponding to realistic spatial orientation and a sense of distance by measuring and determining the user's current position and orientation.

The theoretical background of the feasibility of the solution according to the present invention is described in detail below.

With the rise of virtual reality (VR) and augmented reality (AR) applications, various tools appeared, which can be used to display virtual objects in 3-dimensions, so that the user perceives the virtual environment around them as real. When virtual reality is augmented with virtual objects or other visual elements, it is called augmented reality.

In order to create an augmented reality view, it is necessary to accurately match 3-dimensional reality and virtual space, so that the connection and interaction of the objects in the common representation can be properly realized. When navigating in an environment with poor visibility, for example where visibility is practically zero, due to the poor quality of the image data, the visual information cannot or only partially be matched with the virtual information, but for orientation, the user needs the virtual 3-dimensional map to be spatially matched with objects, topography or other environmental features located in reality. When using a 3-dimensional map, the user can be expected to need to see the virtual view according to his/her sense of distance and orientation, and if he/she changes position and/or orientation (e.g. due to head movement, drifting, etc.), whether intentionally or unintentionally, the virtual view should change accordingly.

In the field of robotics, as a result of the DARPA competition for autonomous cars, so-called SLAM (simultaneous localization and mapping) algorithms are used. The idea is that the process builds and updates a map at the same time as the localisation. In the classic case, the so-called encoders in the wheels of the mobile robot measure the rotation of the axles and, based on these measurements, the rotation of the wheels, as well as the distance travelled can be calculated. However, due to a number of other parameters and environmental effects (e.g. friction, different wheel sizes, load and centre of gravity position, battery charge level, etc.), the measurement can be subject to errors, which, even if negligible, are integrated and the method cannot be used for location determination alone. For this reason, a sensor capable of measuring the relative position and distance of the external environment is usually used, typically a 1-dimensional, 2-dimensional, 3-dimensional rangefinder such as a LIDAR (Light Detection and Ranging) device or camera. Then, based on the measurement of this sensor, the measurement of the internal sensor is refined by correcting any errors, and only then does the system create a map together with the determined current position of the mobile robot. However, the sensor devices used in conventional cases are not capable of providing satisfactory visual quality at poor or practically zero visibility and cannot be used to correct errors or improve the quality of the images in such circumstances.

SUMMARY OF THE INVENTION

The solution according to the invention solved this problem by representing the augmented reality in an environment with a particularly poor visibility, where the system and method simultaneously use sensors that provide the appropriate data to properly present the environment according to the user's position and orientation, and in addition the solution of the present invention also uses a reference database to create an augmented reality experience.

The object of the invention is to implement a system for generating and displaying a continuous and real-time augmented reality view corresponding to a current position and orientation of a user, wherein said system comprises:
- a head-mountable device for a user, comprising
  - a mounting element for a stable fixation on the head,
  - sensors for detecting the physical characteristics of the user and their environment,
  - a display for displaying augmented reality, and
  - an integrated computing and communication unit, wherein the system further comprising a reference database containing reference data, wherein the reference data is composed of sonar images and/or 2-dimensional camera images with different spatial orientations, wherein the data detected by the sensors in a spatial orientation can be matched with reference data in a spatial orientation, further comprising a data storage unit, which is suitable for storing at least spatially orientally matched sensor and reference image pairs, where the integrated computing and communication unit is in communication connection with the sensors, the reference database, the data storage unit and the display.

Preferably the data storage unit comprises a sub-unit for storing the processed sensor data and/or the reference data.

The head-mountable device can be a google-like or helmet-like device with a graphical display.

The head-mountable device preferably comprises one or more sensors selected from the group comprising of:
- sonar,
- inclination sensor for determine the spatial orientation,
- position sensor for determine the absolute position of the user, and
- at least one environmental sensor for detecting external environmental characteristics, where at least one environmental sensor is selected from the group comprising of flow sensor, air movement sensor, temperature sensor, smoke sensor, motion sensor, presence sensor or any other sensor capable of detecting external environmental characteristics, wherein the data detected by each sensor can be fused.

The sonar can be arranged substantially at the centre of the head-mountable device.

The inclination sensor can comprise an IMU sensor.

Th reference data can comprise depth camera images.

Preferably, the system further comprises a deployed static sensor assembly and/or a deployed movable sensor assembly for detecting physical characteristics of the environment, in particular of an external object, wherein the sensor assembly comprises a plurality of sensors having partially overlapping acoustic fields of view and wherein the sensor assembly is in communication connection with the integrated computing and communication unit.

Preferably, the reference data are continuously determined or predetermined data in a given spatial orientation, which are detected by the deployed static sensor assembly and/or the deployed movable sensor assembly; and/or continuously determined data in a given spatial orientation detected by sensors.

The system can further comprise an external processing unit comprising:
- an external computing and communication unit, which has a higher computing capacity than the integrated computing and communication unit of the head-mountable device, where the external computing and communication unit is in communication connection with the sensors, the reference database, the data storage unit and the display, and where the external processing unit is connected to a plurality of head-mounted devices via the integrated computing and communication unit.

Preferably, the system further comprises an external processing unit further comprising:
- a display unit displaying an augmented reality view and/or the absolute position of the user, where the display unit is in communication connection with the integrated computing and communication unit and/or the external computing and communication unit.

The system preferably comprises additional position sensors that can be mounted on at least one arm of the user for determining the position and spatial orientation of at least one arm, wherein the additional position sensors are in communication with the integrated computing and communication unit.

The system can comprise a camera, which is arranged on the head-mountable device and which is in communication connection with the integrated computing and communication unit.

The system can comprise a plurality of reference databases, wherein each reference database comprises different types of reference data, wherein the different types of reference data are combined with each other to correspond to data detected by the sensors based on the spatial orientation.

Another object of the invention is to implement a method for generating and displaying a continuous and real-time augmented reality view corresponding to a current position and orientation of a user, wherein the method comprises:
- continuously measuring physical characteristics of the user and their environment in real-time with sensors arranged on a head-mountable device, wherein the sensors comprise:
  - sonar,
  - inclination sensor for determine spatial orientation, position sensor for determine absolute position of the user, and at least one environmental sensor for detecting external environmental characteristics, wherein at least one environmental sensor is selected from the group comprising of flow sensor, air movement sensor, temperature sensor, smoke sensor, motion sensor, presence sensor or any other sensor capable of detecting external environmental characteristics;

processing measurement data of the sensors by computing and communication unit integrated into the head-mountable device, fusing processed sensor data by the integrated computing and communication unit to generate an augmented reality view, at least based on the change in spatial orientation detected by the inclinometer sensor, continuously modifying the augmented reality view by a processing unit to correspond to the user's current position and spatial orientation, continuously transmitting modified augmented reality view in real-time by the integrated computing and communication unit and displaying on the display of the head-mountable device, based on spatial orientation, matching given spatially oriented fused sensor data with reference data in a reference database by the integrated computing and communication unit, wherein the reference data is composed of sonar images and/or 2-dimensional camera images with different spatial orientations, storing spatially orientally matched fused sensor and reference image pairs in a data storage unit, transmitting the matched fused sensor and reference image pairs by the integrated computing and communication unit transmits to the head-mountable device, displaying a further modified augmented reality view generated from the matched fused sensor and reference image pairs by the integrated computing and communication unit on a display of the head-mountable device.

Preferably, the sonar is arranged at the centre of the head-mountable device.

Preferably, the inclination sensor is an IMU sensor.

Reference data may comprise depth camera images.

Preferably, independently and simultaneously generating augmented reality view of the plurality of head-mountable devices.

Preferably, using an external computing and communication unit in addition to the integrated computing and communication unit, wherein the external computing and communication unit has a higher computing capacity than the integrated computing and communication unit of the head-mountable device.

Preferably, the data processing further comprises fusing data detected by the sensors with data from an additional deployed static sensor assembly and/or an additional deployed mobile sensor assembly.

Preferably, collecting data by an additional position sensor mounted on the at least one arm, and the data processing comprises fusing data detected by the sensors with the data from the additional position sensor mounted on the at least one arm.

Preferably, the data processing comprises fusing data detected by the sensors with a 2-dimensional image data detected by a camera.

Preferably, based on the spatial orientation, matching a given spatially oriented, fused sensor data in combination with different types of reference data from a plurality of reference databases by the integrated computing and communication unit.

Preferably, based on the matched sensor and reference image pairs, automatically generating augmented reality view and displaying on a display of the head-mountable device by the integrated computing and communication unit.

Preferably, the step of matching fused sensor data with reference data in the reference database is implemented by aligning sensor data and reference data according to spatial orientation, or by transformation using a classifier trained with matched sensor and reference image pairs.

BRIEF DESCRIPTION OF THE SEVERAL VIEWS OF THE DRAWINGS

In the following, the system and process according to the invention are described in detail on the basis of the drawing, in which:

the FIG. 1 is a schematic representation of a preferred embodiment of a system according to the invention; the FIG. 2 schematically illustrates the modular design of a preferred embodiment of the system according to the invention with the interconnections of the components and the direction of data flow; the FIG. 3 shows a system according to the invention with deployed static sensor assemblies, wherein a schematic top view of one possible location of the deployed static sensor assemblies around the target area to be investigated is shown; the FIG. 4 is a schematic view of the modular design of the system according to the invention, wherein the system comprises a plurality of head-mountable devices, a deployed static sensor assembly and a deployed moveable sensor assembly, wherein the data processing is performed by an external processing unit of the system; the FIG. 5 is a schematic top view of the location of two target areas and two head-mountable devices according to the invention, wherein the head-mountable devices provide different augmented reality views of the target area depending on the location thereof; the FIG. 6 shows the aligning the current measurement image data to a sonar image of a system according to the invention; the FIG. 7 shows the modular design of a system according to the invention with each method step performed in the computation and communication unit; the FIG. 8 schematically illustrates the use of several different reference databases as training databases to improve measurement data of the sensors; the FIG. 9 schematically shows a flowchart of a possible data collection procedure for training neural networks, the FIG. 10 schematically shows a flowchart of the creation of reference databases for training neural networks, and the FIG. 11 schematically shows a flowchart of the automated method.

DETAILED DESCRIPTION OF THE INVENTION

Figure 1:
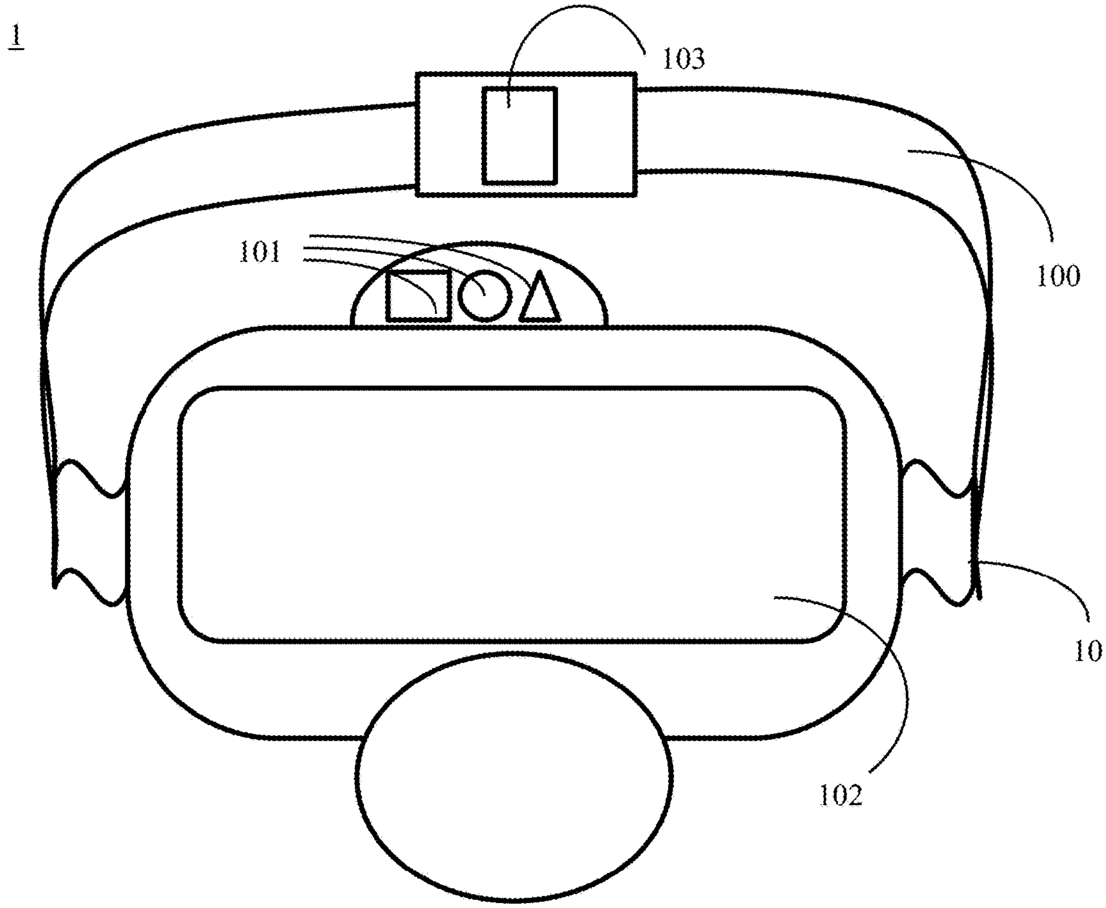

FIG. 1 is a schematic representation of a preferred embodiment of the system 1 according to the invention. The system 1 is provided to generate and display a continuous and real-time augmented reality view AR corresponding to the current position and orientation of a user. The system 1 according to the invention includes a head-mountable device 10 worn by the user, preferably having a goggle-like or helmet-like design. The head-mountable device 10 includes a mounting element 100, which is used for stable attachment to the user's head. For example, the mounting element 100 may be a strap, which fits the user's head and holds the head-mountable device 10 stably in place. The head-mountable device 10 further comprises a plurality of sensors 101 for detecting physical characteristics of the user and the environment surrounding the user, wherein the sensors 101 comprise at least one of a sonar 1010, an inclination sensor 1011, a position sensor 1012, and at least one environmental sensor 1013. FIG. 1 illustrates a preferred embodiment of the system 1, wherein the head-mountable device 10 includes a sonar 1010 positioned substantially at the center of the head-mountable device 10 such that, during application it is positioned substantially at the center of a user's forehead. The sonar 1010 is a sensor for navigation and detection using sound waves, wherein the propagation of the sound wave in a given medium, namely in water or air, can be used to infer the physical characteristics of the environment. In a preferred embodiment, the head-mountable device 10 further comprises an inclination sensor 1010 for determining the spatial orientation, i.e., the orientation of the user. The inclination sensor 1010 is preferably an IMU (inertial measurement unit) sensor. The preferred embodiment according to FIG. 1 further comprises a position sensor 1012 for determining absolute position of the user. The system preferably comprises additional position measurement sensors 1014 (not shown) mounted on at least one arm of the user. The additional position sensors 1014 mounted on the arm are preferably suitable for determining the position and inclination of each segment of the arm, and thus the relative position of each segment with respect to each other. The sensor mounted on the at least one arm may be an IMU sensor. The preferred embodiment according to FIG. 1 further comprises at least one environmental sensor 1013 for detecting external environmental characteristics. The at least one environmental sensor 1013 may be a flow sensor, an air movement sensor, a temperature sensor, a smoke sensor, a motion sensor, a presence sensor, or any other sensor capable of detecting external environmental effects, depending on the application environment. For underwater applications, the use of a flow sensor is particularly advantageous, as the flow measurement can take into account the displacement of the user and objects in the environment. The data detected by each of the sensors 101 in said system 1 can be advantageously fused to produce a record that includes the separately measured physical characteristics of individual elements of the environment.

The head-mountable device 10 of FIG. 1 includes a display 102 for displaying augmented reality view AR, i.e., the visual information generated by the system 1. For example, the display 102 is a graphical display, which is positioned in the user's field of vision when the head-mountable device 10 is used, and which is capable of displaying 2-dimensional and/or 3-dimensional stereo image information. The displayed image information ideally corresponds to what the user would see in a clear, well-lit environment, looking in the direction in which the user's head is currently facing. If the hand position is registered, the augmented reality view AR can also display the position of the hands, thereby helping the user to interact with the environment.

The head-mountable device 10 also includes an 103 integrated computing and communication unit to process data from the 101 sensors and provide the communication connection with the 1 system. The communication connection may be implemented either wired or wireless manner, preferably wireless. The integrated computing and communication unit 103 is, for example, arranged on the mounting element 100 of the head-mountable device 10.

The system 1 further comprises a reference database 20 comprising reference data, wherein the reference data comprises sonar images and/or 2-dimensional camera images, preferably depth camera images, which show the target area to be displayed as augmented reality according to different spatial orientations. The system may comprise a plurality of reference databases 20 containing different types of reference data, for example, the given reference database 20 may comprise only sonar images having different spatial orientations or only 2-dimensional camera images having different spatial orientations. The data detected by 101 sensors, according to a spatial orientation, can be matched with a corresponding spatial orientation reference data. The different types of reference data can also be matched in combination with each other based on a given spatial direction.

The system 1 comprises a data storage unit 30 storing at least spatially orientally matched sensor and reference image pairs, preferably also storing processed sensor data and/or reference data in a storage sub-unit.

The integrated computing and communication unit 103 of the system 1 is in communication connection with the sensors 101, one or more reference databases 20, data storage unit 30 and display 102.

In one embodiment of the system 1, the system 1 further comprises an external processing unit 60 comprising an external computing and communication unit 600 having a greater computing capacity than the integrated computing and communication unit 103 of the head-mountable device 10. Similarly, to the integrated computing and communication unit 103, the external computing and communication unit 600 is in communication connection with the sensors 101, the reference database 20, the data storage unit 30 and the display 102. The external computing and communication unit 600 is preferably connected to a plurality of head-mountable devices 10. The use of multiple head wearable devices 10 is advantageous if the target area is larger or the augmented reality view AR must be created in a short period of time, since with multiple sensors 101, all the input data all the input data that enables the creation of the augmented reality view can be collected sooner. The external processing unit 60 is also capable of communicating with one or more deployed static sensor assemblies 40 and/or one or more deployed moveable sensor assemblies 50, which are described in more detail below. The external processing unit 60 may further comprise a display unit 601 for displaying an augmented reality view AR and/or a user's absolute position, wherein the display unit 601 is in communication connection with one or more integrated computing and communication units 103 of the one or more head-mountable devices 10 and/or the external computing and communication unit 600.

Figure 2:
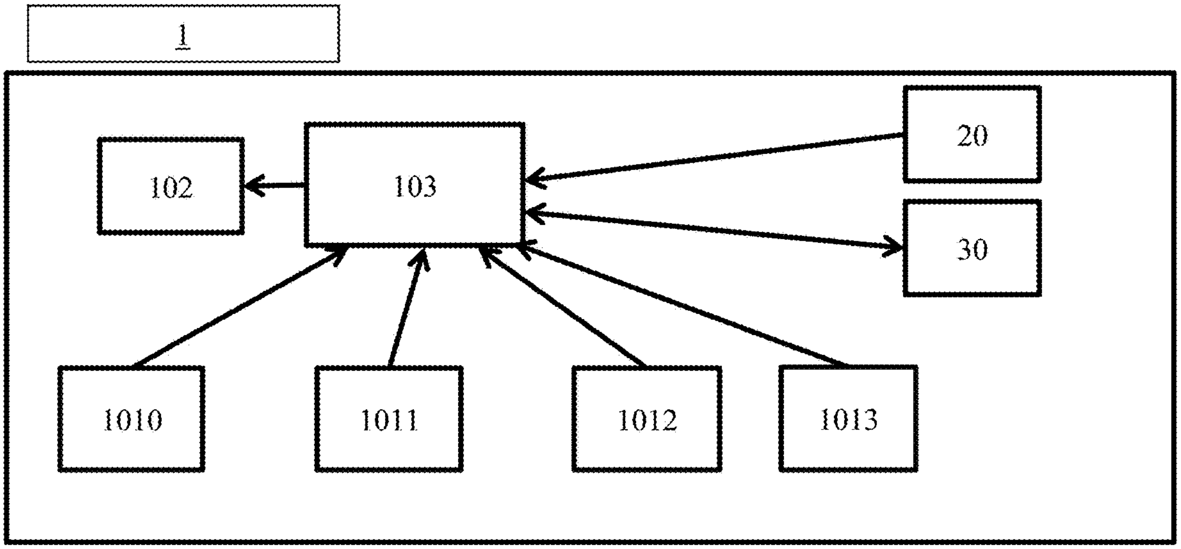

FIG. 2 schematically illustrates the modular structure of the system 1 according to the invention. FIG. 2 also shows the interconnections and the direction of data flow. The central element of the system 1 is an integrated computing and communication unit 103 to which sensors 101, in this case sonar 1010, inclination sensor 1011, position sensor 1012 and at least one environmental sensor 1013, transmit the measured data. The integrated computing and communication unit 103 processes the data measured by the sensors 101 and then matches these data with reference data in the reference database 20 based on the spatial orientation. The matched and augmented reality view AR is displayed 102 to the user. During data processing, the matched sensor and reference image pairs are stored in the data storage unit 30. Based on the stored image pairs, an augmented reality view AR is generated and displayed to the user on the display 102.

Figure 3:
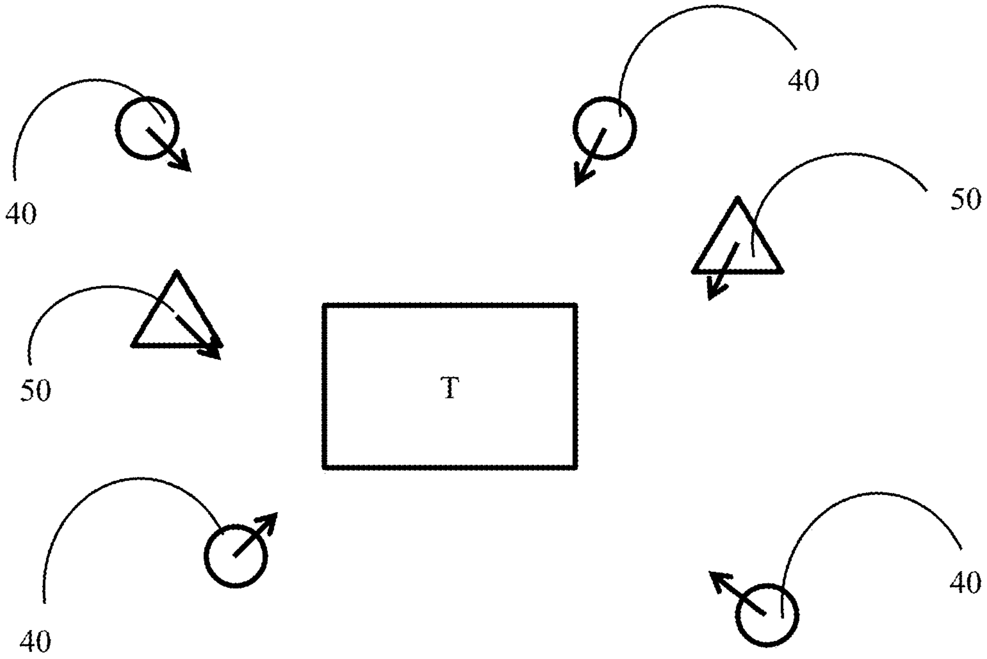

FIG. 3 illustrates a system 1 according to the invention comprising a plurality of deployed static sensor assemblies 40 and a plurality of deployed moveable sensor assemblies 50, wherein a schematic top view of one possible location of the deployed static sensor assemblies 40 and deployed moveable sensor assemblies 50 around the target area T to be investigated is shown. Each of the deployed static sensor assemblies 40 and the deployed movable sensor assemblies 50 contains 101 sensors, e.g., 1010 sonars, the orientation of which to the target area T is indicated by the arrows in the figure. Static sonars 1010 installed in such a position are suitable for taking records according to their orientation. The orientation of the movable sonars 1010 may vary depending on the current position and orientation of the deployed movable sensor assemblies 50. In the arrangement shown in FIG. 3, multiple partially overlapping sonar images of target area T are taken, on the basis of which a more complete augmented reality view AR can be created.

The system 1 in FIG. 3 includes deployed static sensor assemblies 40 and/or deployed movable sensor assemblies 50 to detect the physical characteristics of a target area T, in particular the external object therein. The deployed movable sensor assembly 50 is deployed on a moving object, such as a movable vehicle. The deployed static sensor assembly 40 and the deployed movable sensor assembly 50 comprise a plurality of sensors 101 whose acoustic fields of view preferably partially overlaps. Each sensor assembly 40, 50 is in communication connection with the integrated computing and communication unit 103. Preferably, the sensor 101 may be a sonar 1010 or a camera 1010 capable of recording 2-dimensional camera images.

The reference data in the reference database or databases 20 can be collected using sensors 101 on the head-mountable device 10. In a preferred embodiment of the system 1, the head-mountable device 10 includes a camera 1015 in addition to the other sensors 101, which is in communication connection with the integrated computing and communication unit 103. The camera 1015 is preferably suitable for recording 2-dimensional images. The data comprises data detected by all sensors 101, which are different types of reference data. By using the head-mountable device 10, the data are continuously collected and stored, i.e., by continuously moving it in different directions. The reference data can also be collected by storing data 50 in a given spatial orientation detected by static sensor assembly 40 and/or deployed, movable sensor assembly. The data can be collected before using the head-mountable device 10, in which case predetermined reference data are stored in the data storage unit 30. However, the data can be collected and stored simultaneously and continuously with the use of the head-mountable device 10. Such data can be considered as continuously collected reference data.

Figure 4:
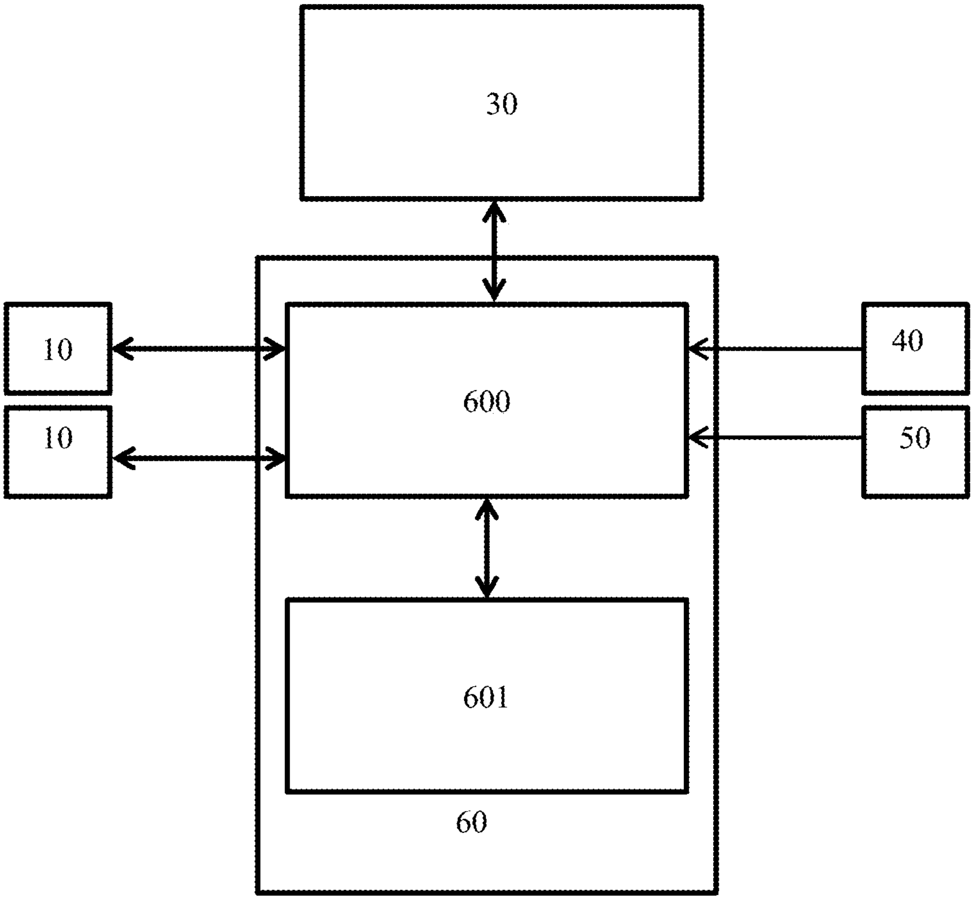

FIG. 4 illustrates a further preferred embodiment of the system 1 according to the invention, wherein the system 1 comprises two head-mountable devices 10, a deployed static sensor assembly 40 and a deployed moveable sensor assembly 50, which detect physical characteristics of the environment with their sensors 101. These devices are in communication connection with an external computing and communication unit 600 of an external processing unit 60. As previously described, the external processing unit 600 has a higher computing capacity than the integrated computing and communication unit 103. The operating principle and function of the external computing and communication unit 600 are the same as the operating principle and function of the integrated communication and computing unit 103, so we refrain from presenting it to avoid repetition. After data processing, the external computing and communication unit 600 stores the matched image pairs in the data storage unit 30 and can display the augmented reality view AR generated from the image pairs on a display unit 601 and/or on the displays 102 of each of the head-mountable devices 10. The use of the external computing and communication unit 600 is particularly advantageous when the system 1 is connected to multiple devices containing sensors 101, as it can process more data more quickly.

Figure 5:
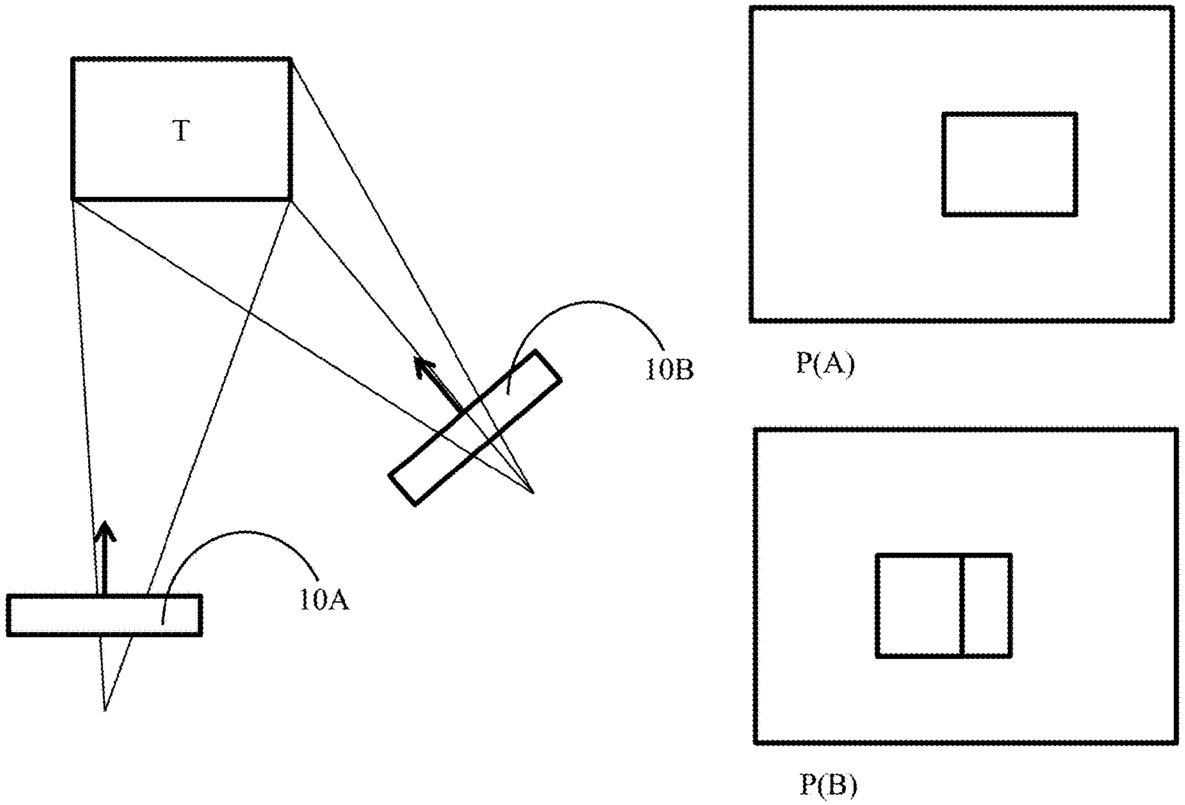

FIG. 5 is a schematic top view of the location of two target areas T and two head-mountable devices 10 according to the invention. The figure is intended to illustrate that from two views, the target area T is represented by system 1 as a different augmented reality view AR. The arrows in the figure indicate the orientation of the sonar 1010 location, which determines the detection direction of system 1 at that location. Depending on the detection orientations, the head-mountable device 10A detects the target area T along its longitudinal side, which is schematically represented as a rectangular object in the presentation of the P (A) image information. The head-mountable device 10B is positioned (at one corner of the target area T) such a way that it detects the target area T along both its long and short sides, so that the P (B) image information is represented as two sides of the object. The fusion of the detected image information P (A) and P (B) of the head-mountable devices 10A, 10B can create a 3-dimensional, augmented reality view AR of the target area T. By moving the head-mountable devices 10A, 10B, the target area T can be fully detected, and then by fusing all the detected data, the target area T can be represented as a 3-dimensional or even 2-dimensional view.

Figure 6:
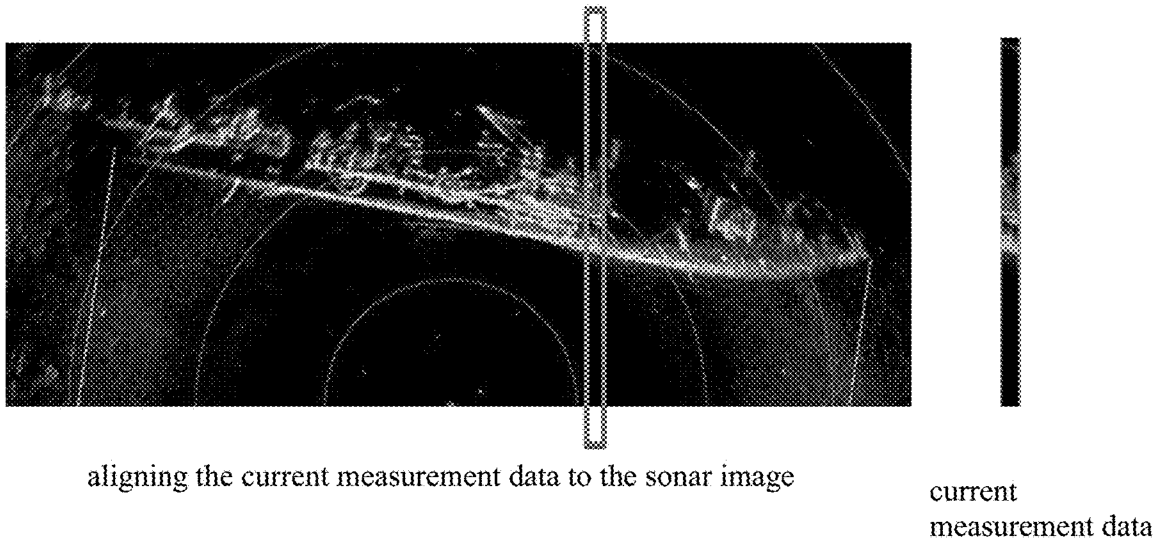

FIG. 6 illustrates the aligning of the current measurement image data of a sonar 1010 of the system 1 according to the invention to a sonar image representing a target area. The sonar 1010 is a 2-dimensional sonar, which can a continuously expand and form an image during movement along a third axis. Subsequently, an accurate registration of a current measurement can be performed by finding the best fit of the measurement data, which is preferably performed by an algorithm, in particular preferably a machine learning algorithm, via the integrated computing and communication unit 103. In order to transform the sonar image into an image, which is similar to the real view, a suitable reference database is also required.

The processing steps of the method for the operation of the system 1 are described in detail below. The operating principle of the system 1 is to generate a suitable, continuous and real-time augmented reality view AR based on continuous measurements from all sensors 101 of the system 1 (in the case of the basic solution, only based on the data of the sensors 101 of the head-mountable device 10) and spatial directional matching via the reference database.

The method comprises:

continuously measuring physical characteristics of the user and their environment in real-time with sensors 101 arranged on a head-mountable device 10, wherein the sensors 101 comprise:

- sonar 1010, which is preferably positioned at the centre of the head-mountable device 10,
- inclination sensor 1010, which is preferably an IMU sensor, for determining the spatial orientation,
- position sensor 1012 for determining absolute position of the user, and at least one environmental sensor 1013 for detecting external environmental characteristics, wherein at least one environmental sensor 1013 is selected from the group consisting of a flow sensor, an air movement sensor, a temperature sensor, a smoke sensor, a motion sensor, a presence sensor, or any other sensor capable of sensing external environmental characteristics;

processing measurement data of the sensors 101 by computing and communication unit 103 integrated into the head-mountable device 10, fusing processed sensor data by the integrated computing and communication unit 103 to generate an augmented reality view AR, at least based on the change in spatial orientation detected by the inclination sensor 1011, continuously modifying the augmented reality view AR by a processing unit to correspond to the user's current position and spatial orientation, continuously transmitting modified augmented reality view AR in real-time by the integrated computing and communication unit 103 and displaying on the display 102 of the head-mountable device 10, and based on spatial orientation, matching given spatially oriented fused sensor data with reference data in a reference database 20 by the integrated computing and communication unit 103, wherein the reference data is composed of sonar images and/or 2-dimensional camera images with different spatial orientations, storing spatially orientally matched fused sensor and reference image pairs in a data storage unit 30, transmitting the matched fused sensor and reference image pairs by the integrated computing and communication unit 103 to the head-mountable device 10, where data can be stored and transmitted simultaneously or sequentially, interchangeably, displaying a further modified augmented reality view AR generated from the matched fused sensor and reference image pairs by the integrated computing and communication unit 103 on a display 102 of the head-mountable device 10.

As a result of the method, an augmented reality view AR is generated that changes continuously in real time in accordance with the changes in the measurement data, based on which the user receives a realistic representation of the environment to be examined.

In a preferred embodiment of the method, a fused sensor data having a given spatial orientation is matched based on spatial orientation in combination with different types of reference data from a plurality of reference databases 20 by the integrated computing and communication unit 103. This means that a reference database 20 contains only one type of reference data, for example only 2-dimensional camera image or only sonar image, which can be considered as input data, so that these input data are matched with the fused sensor data. By combining several different types of reference data, we can create a higher quality augmented reality view AR.

The method can involve creating the augmented reality view AR of multiple head-mountable devices 10 independently and simultaneously, so that the given augmented reality view AR can be displayed separately on the display 102 of a head-mountable device 10. The use of multiple sensors 101, in particular multiple sonars 1010, is advantageous because measuring from a single point, for example a depth image, is not expected to result in complete image information with the adequate, detailed resolution from all sides, because there will be parts that cannot be measured from that point due to shadow effects.

The sensors 101 of the head-mountable device 10 may be supplemented with additional positioning sensors 1014 mounted on at least one arm, with which we also collect data, and during the data processing the data detected by the sensors 101 are also fused with the additional positioning sensor data 1014 mounted on at least one arm. Preferably, a plurality of additional position sensors 1014 are mounted on the user's arms, particularly preferably on different segments of the arms, where the sensor can be, for example, an IMU sensor. By tracking the movement of the arm, the augmented reality view AR can be supplemented with the movement of the user's arms, which mapping can facilitate the user's distance perception.

During the data processing, the data detected by sensors 101 is also fused with a 2-dimensional image data detected by the camera 1015. The matching of the 2-dimensional image provided by the camera 1015 with the fused data from the sensors 101 enables the transformation of a 3-dimensional image into a 2-dimensional image during the process. Both the 2-dimensional and the 3-dimensional image can be displayed to the user as an augmented reality view AR.

Alternatively, it is possible to use one or more, preferably more head-mountable devices 10 with multiple sonars 1010. One or more head-mountable devices 10, and one or more of deployed static 40 and/or deployed mobile sensor assemblies 50 can be used simultaneously.

When using multiple measuring devices, it is important to ensure that they do not interfere with each other, which can be achieved by standard procedure in the field, such as time-division measurement or frequency division. These procedures are well-known in the field, so we will refrain from describing them in this description. By fusing the measurement data provided by multiple devices and then matching them with reference data based on spatial direction, i.e. orientation, a common augmented reality view AR is mapped.

The method may involve the use of an external computing and communication unit 600 in addition to the integrated computing and communication unit 103, where the external computing and communication unit 600 has a greater computing capacity than the integrated computing and communication unit 103 of the head-mountable device 10. The external processing unit 600 is preferably used when a larger amount of data needs to be processed. For example, this can be achieved by predetermining a data volume during the process, and when the data volume is exceeded, the external processing unit 600 performs the required computational tasks. The increased computational capacity of the 600 external processing units allows the necessary procedural operations to be performed more quickly, resulting in an augmented reality view AR.

In a particularly advantageous embodiment of the method according to the invention, based on the stored, matched sensor and reference image pairs, the integrated computing and communication unit 103 automatically generates and displays the augmented reality view AR on a display 102 of the head-mountable device 10. The automatic execution of the operations can be implemented, for example, by algorithms, preferably by a machine learning algorithm, or by one or more neural networks, preferably by a series of neural networks.

In another advantageous embodiment of the method according to the invention, the step of matching the fused sensor data with the reference data in the reference database 20 can be performed in two different ways. First, by spatially orientally matching a fused sensor data with a reference data in a reference database 20. This means that there are two data sets, preferably two image data, which can be considered as spatial point clouds, whose points can be matched, so that the image data can be aligned according to a given spatial direction. Thus, a lower quality fused sensor data can be improved, i.e. corrected and/or supplemented by matching a higher quality reference data. Alternatively, a classifier, which is preferably an algorithm or neural network, can be trained using the already available, matched sensor-reference image pairs.

After the training, the classifier is capable of performing a transformation to create augmented reality. The transformation involves improving the quality of a fused sensor data, supplementing and/or correcting the input image data. The transformation operation of the classifier is faster than the matching operation, since in this case there is no need for matching according to the spatial direction, since this has already performed beforehand for the matched image pairs. Thus, the classifier can perform the transformation using the previously performed matching data.

For the application of neural networks, they need to be trained with so-called training databases to enable automatic operation later on. In the present problem, one or more neural networks can be trained with databases representing good visibility, i.e., training databases, which essentially correspond to one or more of the reference databases 20 of the system 1 according to the invention. As described above, the training databases can use high-quality sonar images, camera images, preferably depth camera images, preferably in combination. A high-quality image is defined as an image dataset that provides a clear visual recognition of the environment and/or objects to be presented, i.e. it has appropriate edges, resolution, etc. The training database or databases can be used to train a neural network that can supplement and/or transform a sonar point cloud-based image into a 2-dimensional camera image, even in low visibility environments.

The application of the automatic operation of neural networks to the system and method according to the invention is illustrated below with detailed schematic descriptions. For a better understanding of the figures, we provided them with captions.

Figure 7:
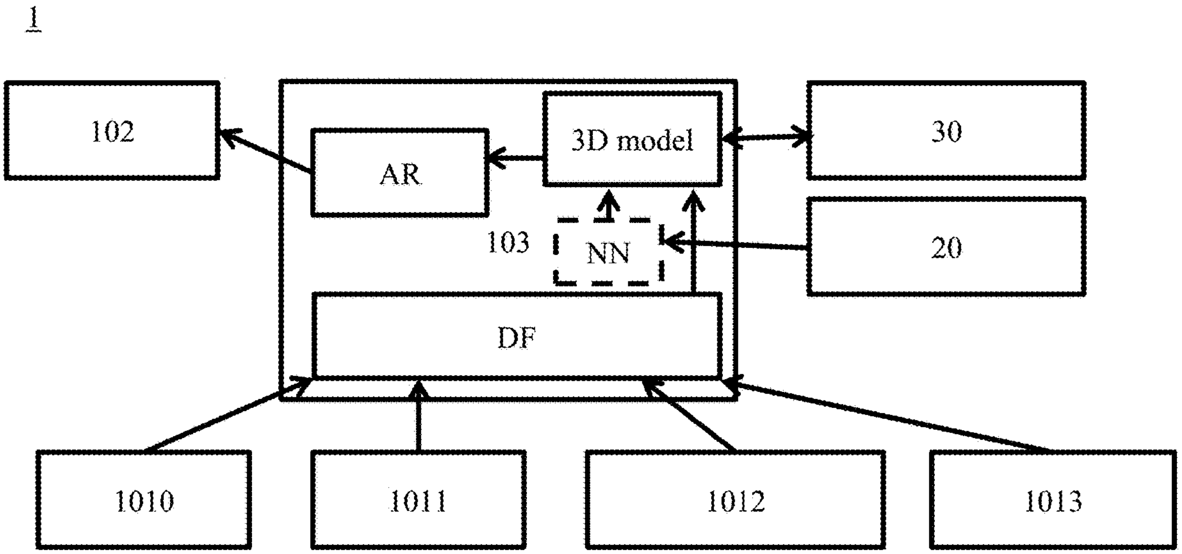

FIG. 7 illustrates the modular structure of a system 1 according to the invention, where the individual process steps in the computing and communication unit 103 are also depicted. The computing and communication unit 103 of the system 1 receives measurement data from the sensors 101, i.e., in the embodiment of FIG. 7, the sonar 1010, the inclination sensor 1012, the position sensor 1012, and at least one environmental sensor 1013, and then fuses them using the data fusion step DF. The reference data in the reference database 20 serve as a training dataset for a neural network NN, which will thereby be able to automatically create an augmented reality view AR. The neural network NN, which is typically a deep convolutional network, improves the image of the fused sensor data with a given orientation by training based on the reference database 20, which can be used to form a 3-dimensional model 3D model. The 3-dimensional model 3D model essentially represents the mapping of fused sensor and reference image pairs in a given spatial orientation, which image pairs are stored in a data storage unit 30. The 3-dimensional model 3D model is used to create the augmented reality view AR, which is a combined representation of all 3-dimensional models 3D model, which changes based on the continuous real-time updating of the data, so that the reality view displayed on the display 102 shows a real-time representation of the environment. FIG. 7 illustrates a possible sequence of procedural steps, but the individual procedural steps and the mapping of the augmented reality view AR are not limited to this sequence of procedural steps.

Figure 8:
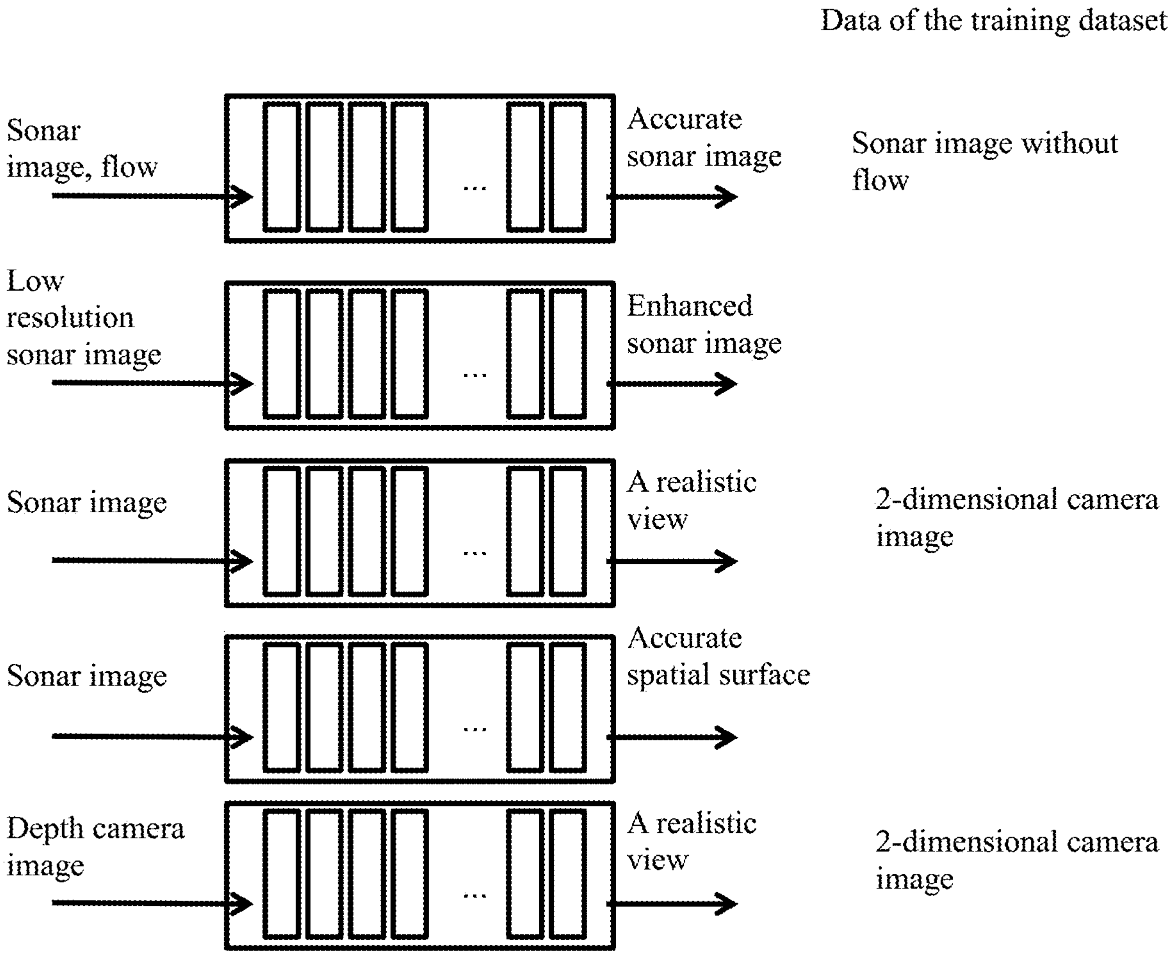

FIG. 8 schematically shows the use of several different reference databases as training databases, using a simplified flowchart to improve the measurement data of the sensors. The neural network itself and its training parameters can provide different working solutions in many cases, so only the most important principles are included in the flowchart. Some cases of teaching are just examples, but neural networks can be taught in other ways. Based on the input image information, the neural network generates an actual augmented reality view AR as output, which ideally matches the real environment, but it may be necessary to modify the weights of the neuronal network based on the difference between the actual output and the expected quality output, typically using back propagation, in order to generate increasingly accurate realistic outputs.

The training schemes in FIG. 8 show several cases that can be combined, either by serial processing or by merging. For example, in an underwater application environment, the training dataset can be collected for example in a controlled pool, where the water is transparent and the flow is adjustable, or eddies can also be created. Preferably, neural network structures are deep convolutional networks that can be learned by backpropagation, but other neural networks can also be used.

The cases shown in FIG. 8 are described in detail below. In case (a), we want to compensate the distortion of the sonar image against the effect of possible flow. In this case, we take recordings from the same position and spatial direction (i.e., orientation) in an environment with and without flow, and use these so that the neural network learns how to produce and transform a no-flow sonar image from the sonar image recorded in flow conditions, knowing the magnitude and direction (and possibly other parameters) of the flow. In case (b), we show the case of how a low-resolution sonar image can be sharpened. This is necessary because there is not always time to create a high accuracy sonar image with many measurements, but with a neural network a higher accuracy sonar image can be generated from less data thanks to the sharpening. In this case, we start with high accuracy sonar images as the training data set, transform them into input data using conventional methods, i.e., scale them down, and this descaled image becomes the input of the neural network. The expected output will be the improved sonar image. Our neural network, in case (c) generates a realistic view from the input sonar image, where the training dataset uses, for example, camera images taken in clear water in an underwater environment. In this case, each camera image is taken from the same position and spatial orientation, which can be matched and paired with the input sonar image. In case (d), a spatial point cloud, depth camera image, is generated from the sonar image. Here the training dataset consists of pairs of synchronized sonar and depth camera images (or lidar images). Case (e) is similar to case (c), but here we start from a depth camera image. The training dataset consists of depth and conventional camera image pairs.

Neural network learning schemes, such as the cases (a)-(e) in FIG. 8, can also be used in combination. A possible sequential (serial) application combinations could be, for example, the following: serial application of cases (a)-(d)-(e), but in order to reduce the measurement calculation time during operation, it may be suggested to add case (b) as follows: serial application of cases (a)-(b)-(d)-(e). In addition, an augmented reality view AR can be generated directly from a sonar image by the sequential application of cases (a)-(b)-(c). A further possible application sequence is (b)-(a)-(d)-(e). For purposes of optimalization, the appropriate combination can be selected according to the calculation time, image quality and application environment.

Figure 9:
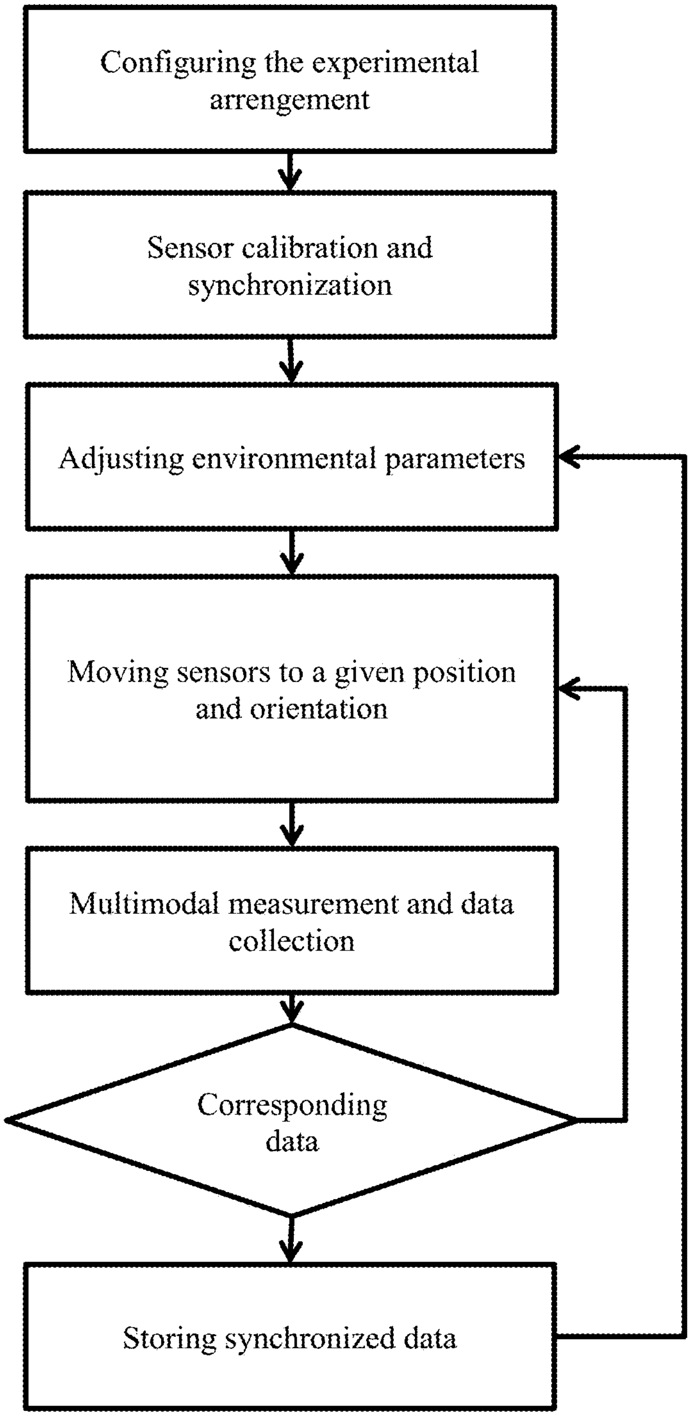

FIG. 9 shows a possible data collection procedure for training neural networks. Data collection can be done, for example, in a controlled experimental environment that is artificially designed to collect optimal quality input data.

The first step is to create the experimental arrangement. The next necessary step is the calibration and synchronisation of the sensors. Then, the relative location (position and orientation) of each device, i.e. the head-mountable device(s) 10, deployed static sensor assembly 40 and/or deployed mobile sensor assembly 50, is measured and, if there are any additional sensors, their calibration and synchronization of communication are also carried out. The data collection is an iterative process, taking place in a known environment with different parameters. Thus, we can change the artificially designed environment by changing or adjusting the parameters, the examined object, or even the lighting conditions. In each examined environment, as many measurements as possible are performed, then the sensors 1010, or more precisely the movable sensors, are moved to a given position and orientation. This should be done in such a way that the entire surface of the examined object is measured, with overlaps, from different distances. One possible method is to take measurements with the highest possible orientation resolution from points selected at the same distances on a bounding circle, considering the object as the centre. From each of these positions, sensor measurement (multimodal measurement and data acquisition) will be performed, which will include a synchronized sonar image and/or a 2-dimensional camera image, and possibly a depth camera image. In addition, if the known measurement parameters and the existing model of the object, i.e. appropriate data, are available, the reference data can be calculated based on these. The data of each synchronized measurement is stored in pairs with the reference data, on the basis of which the neural networks are later trained.

Figure 10:
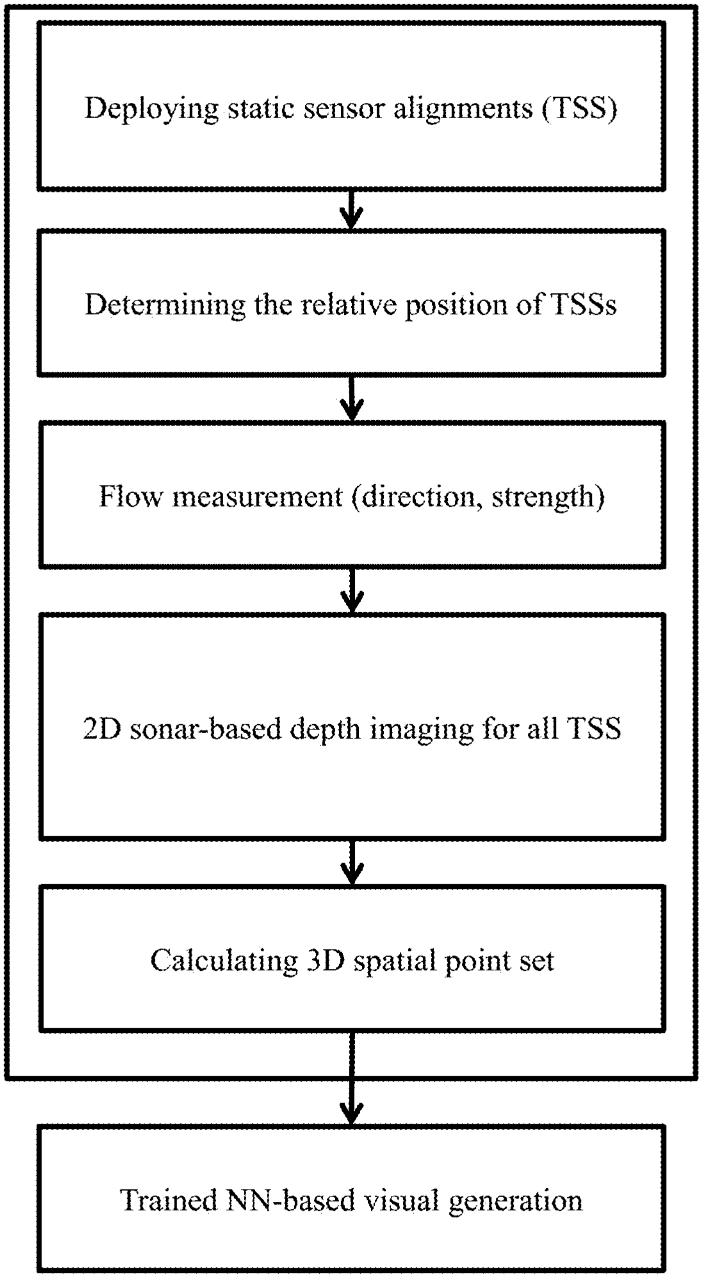

FIG. 10 shows the steps of the initialization procedure for learning neural networks. In a preferred embodiment of system 1, the initialization procedure step is as follows: deploy, i.e., physically place and fix static sensor assemblies 40 (TSS). We determine the relative positions of the deployed static sensor assemblies 40 with respect to each other. The system as shown in FIG. 10 also includes flowmeters to measure and then record 2-dimensional depth sonar images of each of the deployed static sensor assemblies 40, typically of the object to be approached and examined and its surroundings. Based on the obtained sonar images and flow data, we calculate a 3-dimensional spatial point set, which can be also perform using neural networks NN already trained for this purpose. Based on the 3-dimensional spatial point set, we can also generate an augmented reality view AR using trained neural networks NN, essentially from any virtual point. The calculated 3-dimensional spatial point set, in addition to generating the visualization, can help to specify the position and spatial location of the head-mountable devices 10.

Figure 11:
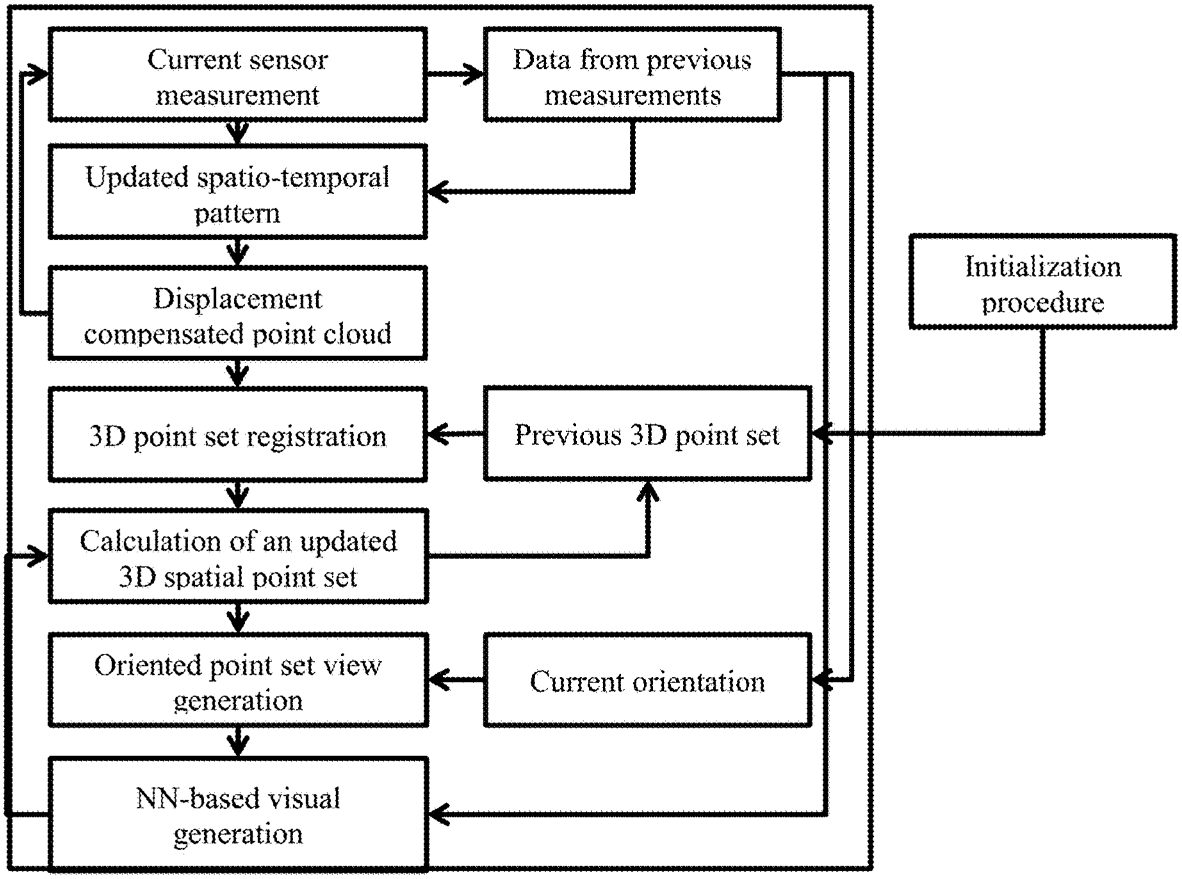

FIG. 11 shows a schematic flow diagram of an operating procedure. The operating procedure in FIG. 11 is the process following the initialization procedure. At this point, the head-mountable devices 10 approach the environment and/or object to be examined, for which there is already a 3-dimensional data set. During the operational procedure, measurements are taken with the 101 sensors of the 10 head-mountable devices and, using the data from the previous measurements, an updated spatio-temporal (depth) pattern is constructed, typically based on the user's continuous change of positional and head movement. From the spatio-temporal patterns, taking into account the displacement, a point cloud is generated and once depth image with sufficient quality, a 2-dimensional surface, is obtained (here we can use the trained neural networks NN), the 3-dimensional point set of the surface is registered. As before, we determine the exact position and orientation with respect to the object, and we also refine the 3-dimensional point set. This is essentially the process of calculating the updated 3-dimensional spatial point set and updating/refine the previous 3-dimensional point set with the new data. Based on the obtained 3-dimensional point set and known spatial orientation, a depth image corresponding to the spatial orientation, i.e. a point set, is calculated, on the basis of which, taking into account the data of the measurements, an augmented reality view AR is generated using the trained neural networks NN. For the user, the update of the augmented reality view AR can be continuous, which means that the current view can always be displayed in real time based on the last updated 3-dimensional spatial points set.

The system and method according to the invention can be used in poor visibility conditions, such as extreme weather conditions, for example in disaster situations, typically where the observation of a target object with conventional camera sensors is not or only very limited possible. Environmental conditions that create such poor visibility on land can be for example smoke from a combustion or other chemical reaction, desert sandstorms, Martian dust storms, poor visibility in rain or snowfall. The solution according to the invention can also solve rescue difficulties in underwater water disaster situations, where darkness due to the depth or impurities in the water prevents the use of a camera.

The system has the advantage of being able to provide an augmented reality view AR even when visibility is poor due to the lighting conditions and/or conditions such as contamination in water. The system is capable of providing an augmented reality view AR even at zero visibility.

The advantage of the solution according to the invention is that different sensors can be used depending on the target area to be monitored, for example underwater flow sensors. During an underwater search or rescue operation, it may happen that even objects thought to be static, such as the hull of a boat, are displaced by the current. By measuring the current with sensors and determining the position of the target object, the solution also allows continuous real-time monitoring of this. With special equipment, the user can navigate in a water environment with sufficient accuracy even in poor visibility conditions. Augmented Reality Visualisation gives the user a visual representation of his/her surroundings and enables him/her to effectively detect in difficult environmental conditions.

Another advantage is that with the help of a suitable machine learning-based neural network, the diver can automatically visualise his/her environment. Neural networks can also be trained with data collected in artificial environments. For example, data for an aquatic environment can be collected in a pool that needs to be made suitable for water flow. This is possible, for example, by introducing n×m flow channels per side (typically spaced every metre), where each flow channel can be switched on independently. Using this approach, it is possible to create a sea wave either by inserting a larger drifting river or by inserting a mechanical module that moves back and forth to create a wave motion.

The neural network can be taught to provide the desired flow, thereby also best approximating natural situations.

A further advantage of the inventive solution is that by using a camera, the 3-dimensional image can be transformed into a 2-dimensional image, so that the system and the method can be used to display the augmented reality view AR as a conventional map-like image.

The invention claimed is:

1. A system (1) for generating and displaying a continuous and real-time augmented reality scene corresponding to a user's current position and orientation, the system (1) consisting of:

a head-worn device (10) for a user, comprising a mounting element (100) for stable attachment to the head, one or more sensors (101) for sensing physical characteristics of the user and the user's environment and outputting data corresponding thereto, the one or more sensors (101) selected from the group consisting of:

a sonar (1010), an inclination sensor (1011) for determining spatial direction, a position sensor (1012) for determining absolute position of the user, and at least one an environmental sensor (1013) for sensing external environmental characteristics, wherein the at least one environmental sensor (1013) is selected from the group consisting of: a flow sensor, an air flow sensor, a temperature sensor, a smoke sensor, a motion sensor, and a presence sensor;

an integrated computing and communication unit (103), and a display (102) for displaying the augmented reality scene;

a reference data database (20) containing reference data, wherein the reference data is formed by sonar images and/or two-dimensional camera images of different spatial directions, wherein the data sensed by the one or more sensors (101) in one spatial direction can be matched with the reference data in the one spatial direction;

a data storage unit (30) configured for storing at least image reference image pairs provided by the one or more sensors (101) matched in the spatial direction, the data storage unit (30) having a sub-unit for storing processed sensor data and/or the reference data;

a fixed, static sensor assembly (40) and/or a fixed, movable sensor assembly (50) in communicative connection with the integrated computing and communication unit (103) for sensing physical characteristics of the environment, wherein the sensor assembly (40, 50) comprises a plurality of sensors whose fields of view are partially overlapping, and the reference data are data in a given spatial direction, continuously or predetermined, sensed by the installed, static sensor assembly (40) and/or the installed, movable sensor assembly (50), and/or data in a given spatial direction, continuously determined, sensed by the plurality of sensors; and an external processing unit (60) which comprises a display unit (601) displaying an augmented reality scene and/or the absolute position of the user, wherein the display unit (601) is in communicative connection with the integrated computing and communication unit (103) and/or an external computing and communication unit (600);

wherein the integrated computing and communication unit (103) is in communicative connection with the one or more sensors (101), the reference data database (20), the data storage unit (30) and the display (102), wherein the sonar (1010) is arranged in a center of the head-worn device (10), and wherein the system further comprises a plurality of reference data databases (20), wherein each reference data database of the plurality of reference data databases contains different types of the reference data, wherein the different types of the reference data can be combined with each other, based on the spatial direction, to correspond to the data sensed by the one or more sensors (101).

2. The system according to claim 1, wherein the reference data comprises depth camera images.

3. The system according to claim 1, wherein the head-worn device (10) is a goggle-like or helmet-like device and the display (102) is a graphic display.

4. The system according to claim 1, wherein the inclination sensor (1011) comprises an inertial measurement unit (IMU) sensor.

5. The system according to claim 1, further comprising position measuring sensors, which can be mounted on at least one arm of the user, for determining a position and spatial orientation of the at least one arm of the user, wherein the position measuring sensors are in communicative connection with the integrated computing and communication unit (103).

6. The system according to claim 1, further comprising a camera (1015) arranged on the head-worn device (10) and being in communication with the integrated computing and communication unit (103).

7. A method for creating and displaying a continuous and real-time augmented reality scene corresponding to a current position and orientation of a user utilizing the system of claim 1, comprising:

continuously measuring the physical characteristics of the user and the user's environment in real time with the one or more sensors (101) arranged on the head-worn device (10);

processing measurement data of the one or more sensors (101) with the integrated computing and communication unit (103) integrated into the head-worn device (10);

fusing the processed measurement data of the one or more sensors (101) by means of the integrated computing and communication unit (103) to create an augmented reality scene;

storing the fused data from the one or more sensors and the reference image pairs according to spatial direction of the user in the data storage unit (30);

matching the stored fused data from the one or more sensors of a given spatial direction of the user in the integrated computing and communication unit (103) to the reference data in the reference data database (20) based on the spatial direction of the user;

using the sonar images and/or two-dimensional camera images of different spatial directions of the user as the reference data; and continuously modifying the generated augmented reality scene so that it corresponds to the current position and a current spatial direction of the user;

transmitting the matched fused data of the one more sensors and the reference image pairs to the head-word device using the integrated computing and communication unit (103);

displaying the further modified augmented reality scene created based on the matched fused data of the one or more sensors and the reference image pairs on the display of the head-worn device using the integrated computing and communication unit (103); and modifying the augmented reality scene based at least on a change in the spatial direction of the user so that it corresponds to the current position and the spatial direction of the user.

8. The method according to claim 7, wherein during the processing of the measurement data of the one or more sensors, the measurement data detected by the one or more sensors (101) is also fused with data of the static sensor assembly (40) and/or the movable sensor assembly (50).

9. The method according to claim 7, wherein during the processing of the measurement data of the one or more sensors, the measurement data detected by the one or more sensors (101) is also fused with two-dimensional image data detected by a camera (1015).

10. The method according to claim 7, further comprising combining a given spatially directional, fused sensor data with different types of the reference data from a plurality of reference data databases (20) via the integrated computing and communication unit (103) and matching with the reference data in the reference data database (20) based on the spatial direction of the user.

11. The method according to claim 7, further comprising implementing the step of matching the fused sensor data with the reference data in the reference data database (20) by matching a sensor data and the reference data in the spatial direction of the user or by transforming a classifier trained with matched sensor image and reference image pairs.

* * * * *